US008298978B2

(12) United States Patent
Gao et al.

(10) Patent No.: US 8,298,978 B2
(45) Date of Patent: Oct. 30, 2012

(54) REACTOR CONTINUITY

(75) Inventors: Xiaoliang Gao, Calgary (CA); Billy Gaspar Santos, Calgary (CA); Peter Phung Minh Hoang, Calgary (CA); Amy Marie Jones, Airdrie (CA); Benjamin Milton Shaw, Calgary (CA); Ian Ronald Jobe, Calgary (CA)

(73) Assignee: Nova Chemicals (International) S.A., Fribourg (CH)

( * ) Notice: Subject to any disclaimer, the term of this patent is extended or adjusted under 35 U.S.C. 154(b) by 133 days.

(21) Appl. No.: 12/925,135

(22) Filed: Oct. 14, 2010

(65) Prior Publication Data

US 2011/0092654 A1  Apr. 21, 2011

(30) Foreign Application Priority Data

Oct. 20, 2009  (CA) ..................................... 2683019

(51) Int. Cl.
*C08F 4/6592* (2006.01)
*C08F 4/642* (2006.01)
*C08F 4/649* (2006.01)
*B01J 31/22* (2006.01)

(52) U.S. Cl. ........ 502/152; 502/103; 502/104; 502/120; 502/122; 502/162; 526/129; 526/140; 526/160; 526/161; 526/165; 526/943

(58) Field of Classification Search .............. 502/104, 502/152, 162, 120, 122; 526/160, 161, 165, 526/129, 140, 943
See application file for complete search history.

(56) References Cited

U.S. PATENT DOCUMENTS

| 3,917,466 | A  | 11/1975 | Henry, Jr. |
| 4,182,810 | A  | 1/1980  | Willcox |
| 4,325,849 | A  | 4/1982  | Rosen et al. |
| 5,684,097 | A  | 11/1997 | Palmroos et al. |
| 6,117,955 | A  | 9/2000  | Agapiou et al. |
| 6,140,432 | A  | 10/2000 | Agapiou et al. |
| 6,271,325 | B1 | 8/2001  | McConville et al. |
| 6,281,306 | B1 | 8/2001  | Oskam |
| 6,562,924 | B2 | 5/2003  | Benazouzz et al. |
| 6,639,028 | B2 | 10/2003 | Heslop et al. |
| 6,646,074 | B2 | 11/2003 | Herzog et al. |
| 6,653,416 | B2 | 11/2003 | McDaniel et al. |
| 6,734,266 | B2 | 5/2004  | Gao et al. |
| 7,001,962 | B2 | 2/2006  | Gao et al. |
| 7,005,400 | B2 | 2/2006  | Takahashi |
| 7,273,912 | B2 | 9/2007  | Jacobsen et al. |
| 7,442,750 | B2 | 10/2008 | Jacobsen et al. |

OTHER PUBLICATIONS

Pearl et al, The Surface Structure of Silica Gel, J. Phys. Chem., Aug. 1968, pp. 2926-2933, vol. 72, No. 8.

*Primary Examiner* — Caixia Lu
(74) *Attorney, Agent, or Firm* — Kenneth H Johnson

(57) ABSTRACT

Single site reactor/catalyst continuity in a dispersed phase reaction in terms of initial activation and subsequent deactivation may be improved by treating the support with a metal salt. The activator and catalyst are then deposited on the treated support. The resulting catalyst has a lower consumption of ethylene during initiation and a lower rate of deactivation. Preferably the catalyst is used with an antistatic agent.

37 Claims, 3 Drawing Sheets

REACTOR CONTINUITY

FIELD OF THE INVENTION

The present invention relates to improving the reactor/catalyst continuity in a dispersed phase (i.e. gas phase, fluidized bed or stirred bed or slurry phase) olefin polymerization particularly in the presence of a single site catalyst. There are a number of factors which impact on reactor continuity in a dispersed phase polymerization. Particularly there may be fouling which will decrease catalyst productivity and reactor operability. The decrease in catalyst productivity or activity is reflected by a decrease in ethylene uptake over time.

BACKGROUND OF THE INVENTION

Single site catalysts for the polymerization of alpha olefins were introduced in the mid 1980's. These catalysts are more active than the prior Ziegler Natta catalysts, which may lead to issues of polymer agglomeration. Additionally, static may contribute to the problem. As a result reactor continuity (e.g. fouling and also catalyst life time) may be a problem.

The kinetic profile of many single site catalysts starts off with a very high activity over a relatively short period of time, typically about the first five minutes of the reaction, the profile then goes through an inflection point and decreases rapidly for about the next five minutes and thereafter there is period of relative slower decline in the kinetic profile. This may be measured by the ethylene uptake, typically in standard liters of ethylene per minute in the reactor.

There is no prior art that the Applicant is aware of which expressly discloses a process to modify (improve) the kinetic profile of a supported single site catalyst. There are a number of patents which teach modified porous inorganic supports for polymerizations using single site catalysts. However, none of these patents expressly disclose that the kinetic profile of the resulting catalyst is modified.

U.S. Pat. No. 6,734,266 issued May 11, 2004 to Gao et al., assigned to NOVA Chemicals (International) S.A. teaches sulfating the surface of porous inorganic support with an acid, amide or simple salt such as an alkali or alkaline earth metal sulphate. The resulting treated support may be calcined. Aluminoxane and a single site catalyst are subsequently deposited on the support. The resulting catalyst shows improved activity. However, the patent fails to teach or suggest depositing zirconium sulphate on a silica support.

U.S. Pat. No. 7,001,962 issued Feb. 21, 2006 to Gao et al., assigned to NOVA Chemicals (International) S.A. teaches treating a porous inorganic support with a zirconium compound including zirconium sulphate and an acid such as a fluorophosphoric acid, sulphonic acid, phosphoric acid and sulphuric acid. The support is dried and may be heated under air at 200° C. and under nitrogen up to 600° C. Subsequently a trialkyl aluminum compound (e.g. triethyl aluminum) or an alkoxy aluminum alkyl compound (e.g. diethyl aluminum ethoxide) and a single site catalyst are deposited on the support. The specification teaches away from using aluminoxane compounds. The activity of these supports is typically lower than the activity of the catalyst of U.S. Pat. No. 6,734,266 (compare Table 5 of U.S. Pat. No. 7,001,962 with Table 2 of U.S. Pat. No. 6,734,266). The present invention eliminates the required acid reagent that reacts with the zirconium compound.

U.S. Pat. No. 7,273,912 issued Sep. 25, 2007 to Jacobsen et al., assigned to Innovene Europe Limited, teaches a catalyst which is supported on a porous inorganic support which has been treated with a sulphate such as ammonium sulphate or an iron, copper, zinc, nickel or cobalt sulphate. The support may be calcined in an inert atmosphere at 200 to 850° C. The support is then activated with an ionic activator and then contacted with a single site catalyst. The patent fails to teach aluminoxane compounds and zirconium sulphate.

U.S. Pat. No. 7,005,400 issued Feb. 28, 2006 to Takahashi assigned to Polychem Corporation teaches a combined activator support comprising a metal oxide support and a surface coating of a group 2, 3, 4, 13 and 14 oxide or hydroxide different from the carrier. The support is intended to activate the carrier without the conventional "activators". However, in the examples the supported catalyst is used in combination with triethyl aluminum. The triethyl aluminum does not appear to be deposited on the support. Additionally the patent does not teach phosphinimine catalysts.

U.S. Pat. No. 7,442,750 issued Oct. 28, 2008 to Jacobsen et al., assigned to Innovene Europe Limited teaches treating an inorganic metal oxide support typically with a transition metal salt, preferably a sulphate, of iron, copper, cobalt, nickel, and zinc. Then a single site catalyst, preferably a constrained geometry single site catalyst and an activator are deposited on the support. The activator is preferably a borate but may be an aluminoxane compound. The disclosure appears to be directed at reducing static in the reactor bed and product in the absence of a conventional antistatic agent such as STADIS®.

U.S. Pat. No. 6,653,416 issued Nov. 25, 2003 to McDaniel at al., assigned to Phillips Petroleum Company, discloses a fluoride silica-zirconia or titania porous support for a metallocene catalyst activated with an aluminum compound selected from the group consisting of alkyl aluminums, alkyl aluminum halides and alkyl aluminum alkoxides. Comparative examples 10 and 11 show the penetration of zirconium into silica to form a silica-zirconia support. However, the examples (Table 1) show the resulting catalyst has a lower activity than those when the supports were treated with fluoride.

None of the above art suggests treating the support with an antistatic agent.

The use of a salt of a carboxylic acids, especially aluminum stearate, as an antifouling additive to olefin polymerization catalyst compositions is disclosed in U.S. Pat. Nos. 6,271,325 (McConville et al. to Univation) and 6,281,306 (Oskam et al. to Univation).

The preparation of supported catalysts using an amine antistatic agent, such as the fatty amine sold under the trademark KEMANINE AS-990, is disclosed in U.S. Pat. Nos. 6,140,432 (Agapiou et al.; to Exxon) and 6,117,955 (Agapiou et al.; to Exxon).

Antistatic agents are commonly added to aviation fuels to prevent the buildup of static charges when the fuels are pumped at high flow rates. The use of these antistatic agents in olefin polymerizations is also known. For example, an aviation fuel antistatic agent sold under the trademark STADIS™ composition (which contains a "polysulfone" copolymer, a polymeric polyamine and an oil soluble sulfonic acid) was originally disclosed for use as an antistatic agent in olefin polymerizations in U.S. Pat. No. 4,182,810 (Wilcox, to Phillips Petroleum). The examples of the Wilcox '810 patent illustrate the addition of the "polysulfone" antistatic agent to the isobutane diluent in a commercial slurry polymerization process. This is somewhat different from the teachings of the earlier referenced patents—in the sense that the carboxylic acid salts or amine antistatics of the other patents were added to the catalyst, instead of being added to a process stream.

The use of "polysulfone" antistatic composition in olefin polymerizations is also subsequently disclosed in:

1) chromium catalyzed gas phase olefin polymerizations, in U.S. Pat. No. 6,639,028 (Heslop et al.; assigned to BP Chemicals Ltd.);

2) Ziegler Natta catalyzed gas phase olefin polymerizations, in U.S. Pat. No. 6,646,074 (Herzog et al.; assigned to BP Chemicals Ltd.); and 3) metallocene catalyzed olefin polymerizations, in U.S. Pat. No. 6,562,924 (Benazouzz et al.; assigned to BP Chemicals Ltd.).

The Benazouzz et al. patent does teach the addition of STADIS™ antistat agent to the polymerization catalyst in small amounts (about 150 ppm by weight). However, in each of the Heslop et al. '028, Herzog et al. '074 and Benazouzz et al. '924 patents listed above, it is expressly taught that it is preferred to add the STADIS™ antistat directly to the polymerization zone (i.e. as opposed to being an admixture with the catalyst).

None of the above art discusses the kinetic profile of the catalyst system. One of the difficulties with high activity ("hot") catalyst is that they tend to have a very high initial reactivity (ethylene consumption) that goes through an inflection point and rapidly decreases over about the first 10 minutes of reaction and then decreases at a much lower rate over the next 50 minutes together with fluctuations in reactor temperature. It is desirable to have a high activity catalyst (e.g. more than about 1500 grams of polymer per gram of supported catalyst normalized to 200 psig (1379 kPa) ethylene partial pressure and 90° C.) having a kinetic profile for a plot of ethylene consumption in standard liters of ethylene per minute against time in minutes, corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40, preferably greater than 60 most preferably from 120 to 300 data points, is less than 3.5, preferably less than 3, most preferably less than 2.

The present invention seeks to provide a catalyst having a kinetic profile as described above, optionally having reduced static and its use in the dispersed phase polymerization of olefins.

SUMMARY OF THE INVENTION

The present invention provides a method of making a catalyst system having an activity greater than 1500 g of polymer per gram of supported catalyst per hour normalized to 200 psig (1378 kPa) ethylene partial pressure and 90° C. and having a kinetic profile for a plot of ethylene consumption in standard liters of ethylene per minute against time in minutes, at a reaction pressure of 1379 kPag (200 psig) and 90° C., corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40 data points, is less than 3.5, comprising:

i) impregnating a porous particulate inorganic oxide support having an average particle size from 10 to 150 microns, a surface area greater than 100 m²/g and a pore volume greater than 0.3 ml/g with (ii) at least a 1 weight % aqueous solution of a metal salt selected from the group consisting of $Zr(SO_4)_2 \cdot 4H_2O$, $ZrO(NO_3)_2$ and $Fe(NO_3)_3$ and hydrates thereof to provide not less than 1 weight % based on the weight of the support of said salt;

(iii) recovering the impregnated support;

(iv) calcining said impregnated support at a temperature from 300° C. to 630° C. for a time from 2 to 20 hours in an inert atmosphere;

(v) and either (a) contacting said calcined support with a hydrocarbyl solution containing at least 5 weight % of an aluminum activator compound of the formula:

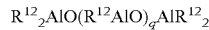

$$R^{12}{}_2AlO(R^{12}AlO)_q AlR^{12}{}_2$$

wherein each $R^{12}$ is independently selected from the group consisting of $C_{1-20}$ hydrocarbyl radicals and q is from 3 to 50 to provide from 0.1 to 30 weight % of said aluminum compound based on the weight of said calcined support; optionally separating said activated support from said hydrocarbyl solution and contacting said activated support with a hydrocarbyl solution containing at least 5 weight % of a single site catalyst as set out below or (b) contacting said support with a hydrocarbyl solution containing at least 5 weight % of an aluminum activator compound of the formula:

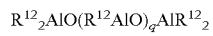

$$R^{12}{}_2AlO(R^{12}AlO)_q AlR^{12}{}_2$$

wherein each $R^{12}$ is independently selected from the group consisting of $C_{1-20}$ hydrocarbyl radicals and q is from 3 to 50 and at least 5 weight % of a single site catalyst of the formula:

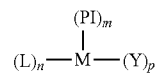

$$(L)_n\text{—}M\text{—}(Y)_p$$
$$(PI)_m$$

wherein M is selected from the group consisting of Ti, Zr and Hf; PI is a phosphinimine ligand of the formula:

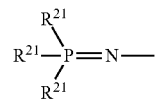

wherein each $R^{21}$ is independently selected from the group consisting of a hydrogen atom; a halogen atom; $C_{1-10}$ hydrocarbyl radicals which are unsubstituted by or further substituted by a halogen atom; $C_{1-8}$ alkoxy radicals; $C_{6-10}$ aryl or aryloxy radicals; amido radicals; silyl radicals of the formula:

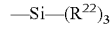

$$\text{—Si—}(R^{22})_3$$

wherein each $R^{22}$ is independently selected from the group consisting of hydrogen, a $C_{1-8}$ alkyl or alkoxy radical, and $C_{6-10}$ aryl or aryloxy radicals; and a germanyl radical of the formula:

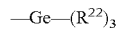

$$\text{—Ge—}(R^{22})_3$$

wherein $R^{22}$ is as defined above;

L is a monoanionic ligand selected from the group consisting of a cyclopentadienyl-type ligand; Y is independently selected from the group consisting of activatable ligands; m is 1 or 2; n is 0 or 1; p is an integer and the sum of m+n+p equals the valence state of M to provide a molar ratio of Al:Ti on the catalyst from 10:1 to 500:1; and (vi) recovering and drying the catalyst.

The present invention also provides a catalyst made by the above process.

The present invention also provides a dispersed phase olefin polymerization process having improved reactor continuity conducted in the presence of a catalyst prepared according to the above noted process.

DETAILED DESCRIPTION

Figure 1:
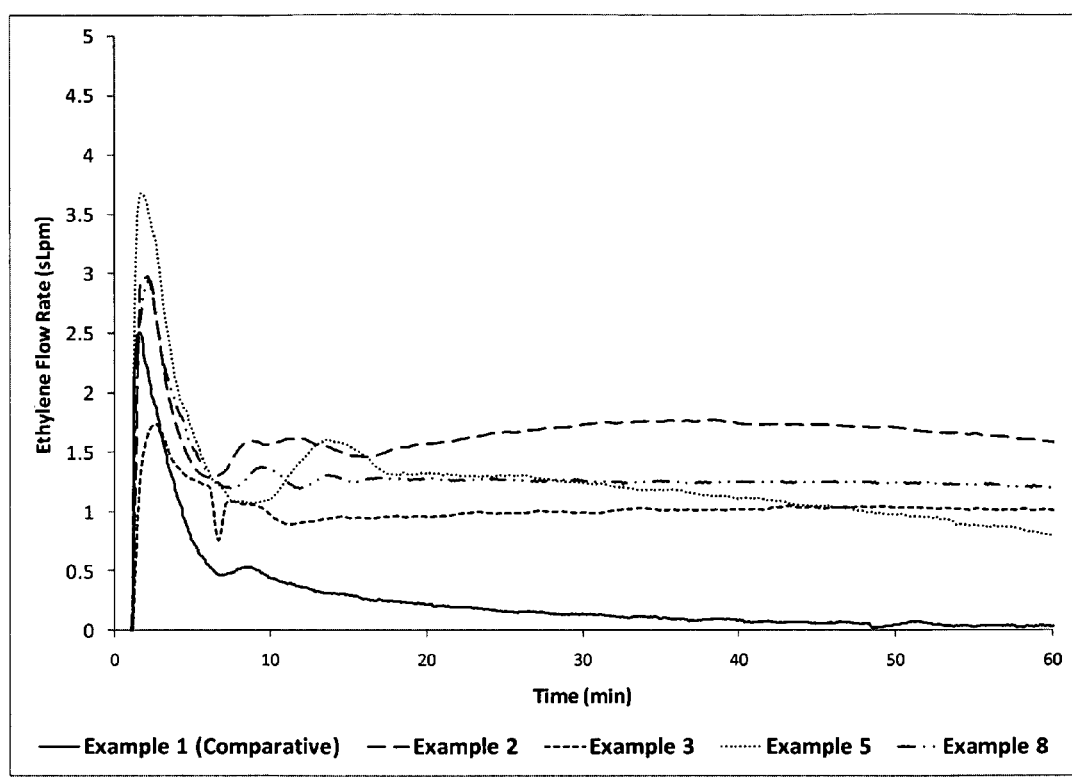
FIG. 1 is the reactor profile for ethylene uptake for examples 1, 2, 3, 5 and 8.

As used in this specification dispersed phase polymerization means a polymerization in which the polymer is dispersed in a fluid polymerization medium. The fluid may be liquid in which case the polymerization would be a slurry phase polymerization or the fluid could be gaseous in which case the polymerization would be a gas phase polymerization, either fluidized bed or stirred bed.

As used in this specification kinetic profile means a plot of ethylene consumption in standard liters of ethylene per minute against time in minutes, corrected for the volume of ethylene in the reactor prior to the commencement of the reaction, in a 2 liter reactor over a period of time from 0 to 60 minutes.

As used in this specification gram of supported catalyst means a gram of the catalyst and activator on the support treated with $Zr(SO_4)_2.4H_2O$, $ZrO(NO_3)_2$ or $Fe(NO_3)_3$ as the case may be.

The Support

The support for the catalysts of the present invention comprises a silica oxide substrate having a pendant reactive moiety. The reactive moiety may be a siloxyl radical but more typically is a hydroxyl radical. The support should have an average particle size from about 10 to 150 microns, preferably from about 20 to 100 microns. The support should have a large surface area typically greater than about 100 $m^2/g$, preferably greater than about 250 $m^2/g$, most preferably from 300 $m^2/g$ to 1,000 $m^2/g$. The support will be porous and will have a pore volume from about 0.3 to 5.0 ml/g, typically from 0.5 to 3.0 ml/g.

It is important that the support be dried prior to the initial reaction with an aluminum activator. Generally, the support may be heated at a temperature of at least 200° C. for up to 24 hours, typically at a temperature from 500° C. to 630° C., preferably from 550° C. to 600° C. for about 2 to 20, preferably 4 to 10 hours. The resulting support will be free of adsorbed water and should have a surface hydroxyl content from about 0.1 to 5 mmol/g of support, preferably from 0.5 to 3 mmol/g of support.

Silica suitable for use as a support in the present invention is amorphous. For example, some commercially available silicas are marketed under the trademark of Sylopol® 958, 955 and 2408 by Davison Catalysts a Division of W. R. Grace and Company and ES70 and ES70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

The resulting support is in the form of a free flowing dry powder.

Treatment of the Support

The support is treated with a solution selected from the group consisting of $Zr(SO_4)_2.4H_2O$, $ZrO(NO_3)_2$, and $Fe(NO_3)_3$, preferably $Zr(SO_4)_2.4H_2O$.

Typically a 5 to 15, preferably an 8 to 12, most preferably a 9 to 11 weight % aqueous solution of metal salt (e.g. $Zr(SO_4)_2.4H_2O$, $ZrO(NO_3)_2$, or $Fe(NO_3)_3$ and hydrates thereof) is used to treat the support. The dry support is contacted with the solution of the metal salt at a temperature from 10° C. to 50° C., preferably from 20 to 30° C., for a time of not less than 30 minutes, typically from 1 to 10 hours, preferably from 1 to 4 hours, until the support is thoroughly impregnated with the solution.

The impregnated support is then recovered typically by drying at an elevated temperature from 100° C. to 150° C., preferably from 120° C. to 140° C., most preferably from 130° C. to 140° C., for about 8 to 12 hours (e.g. overnight). Other recovery methods would be apparent to those skilled in the art. The dried impregnated support is then calcined as described above, in an inert atmosphere preferably at a temperature from 500° C. to 630° C., preferably from 550° C. to 600° C. for about 2 to 20, preferably 4 to 10 hours. Without being bound by theory it's believed that a substantial amount (e.g. over 95%, likely over 98% by weight of the $Fe(NO_3)_3$ is oxidized to $Fe_2O_3$. The $Zr(SO_4)_2.4H2O$ is substantially unchanged. Less than 3% is converted to the metal oxide (e.g. $ZrO_2$). It is believed that under the conditions of treatment the $ZrO(NO_3)_2$ is substantially (e.g. greater than 80 wt %, preferably greater than 90 wt %) converted to $ZrO_2$ (Zirconia)

Generally, a 2 to 50, typically a 5 to 15, preferably an 8 to 12, most preferably a 9 to 11 weight % aqueous solution of the metal salt (e.g. $Zr(SO_4)_2.4H_2O$) is used to treat the support. The dry support is contacted with the salt solution at a temperature from 10° C. to 50° C., preferably from 20° C. to 30° C. for a time of not less than 30 minutes, typically from 1 to 10 hours, preferably from 1 to 4 hours, until the support is thoroughly impregnated with the metal salt (e.g. $Zr(SO_4)_2.4H_2O$) solution.

The resulting dried and calcined support is then contacted sequentially with the activator and the catalyst in an inert hydrocarbon diluent The Activator The activator is an aluminoxane compound of the formula $R^{12}_2AlO(R^{12}AlO)_qAlR^{12}_2$ wherein each $R^{12}$ is independently selected from the group consisting of $C_{1-20}$ hydrocarbyl radicals and q is from 3 to 50. In the aluminum activator preferably $R^{12}$ is a $C_{1-4}$ alkyl radical, preferably a methyl radical and q is from 10 to 40. Optionally, a hindered phenol may be used in conjunction with the aluminoxane to provide a molar ratio of Al:hindered phenol from 2:1 to 5:1 if the hindered phenol is present. Generally the molar ratio of Al:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tert-butyl-4-ethyl-phenol.

The aluminum compounds (aluminoxanes and optionally hindered phenol) are typically used as activators in substantial molar excess compared to the amount of transition metal (e.g. group 4 transition metal) in the catalyst. Aluminum:transition metal (in the catalyst) molar ratios of from 10:1 to 10,000:1 are preferred, most preferably 10:1 to 500:1 especially from 40:1 to 120:1.

Typically the loading of the alminoxane compound may range from 0.05 up to 30 weight % preferably from 0.1 to 2 weight %, most preferably from 0.15 to 1.75 weight % based on the weight of the calcined support impregnated with metal salt.

The aluminoxane is added to the support in the form of a hydrocarbyl solution, typically at a 5 to 30 weight % solution, preferably an 8 to 12 weight % solution, most preferably a 9 to 10 weight % solution. Suitable hydrocarbon solvents include $C_{6-12}$ hydrocarbons which may be unsubstituted or substituted by $C_{1-4}$ alkyl group such as pentane, hexane, heptane, octane, cyclohexane, methylcyclohexane, toluene, or hydrogenated naphtha. An additional solvent is Isopar E ($C_{8-12}$ aliphatic solvent, Exxon Chemical Co.).

The treated support may optionally be filtered and/or dried under an inert atmosphere (e.g. $N_2$) and optionally at reduced pressure, preferably at temperatures from room temperature up to about 80° C.

The optionally dried support with activator is then contacted with the catalyst again in a hydrocarbyl solution as noted above.

In an alternate embodiment the support could be treated with a combined solution of activator and catalyst.

The Catalyst

The catalyst is a

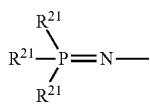

wherein M is selected from the group consisting of Ti, Zr and Hf; PI is a phosphinimine ligand of the formula

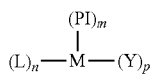

wherein each $R^{21}$ is independently selected from the group consisting of a hydrogen atom; a halogen atom; hydrocarbyl radicals, typically $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

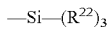

wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

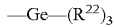

wherein $R^{22}$ is as defined above;

L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

The preferred phosphinimines are those in which each $R^{21}$ is a hydrocarbyl radical, preferably a $C_{1-6}$ hydrocarbyl radical, most preferably a $C_{1-4}$ hydrocarbyl radical.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents selected from the group consisting of $C_{1-10}$ hydrocarbyl radicals which are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl radical, an aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, $C_{6-10}$ aryl or aryloxy radicals; and germanyl radicals of the formula Ge—$(R)_3$ wherein R is as defined above.

Preferably the cyclopentadienyl-type ligand is selected from the group consisting of a cyclopentadienyl radical, an indenyl radical and a fluorenyl radical which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. Preferably, Y is selected from the group consisting of a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands.

The loading of the catalyst on the support should be such to provide from about 0.010 to 0.50, preferably from 0.015 to 0.40, most preferably from 0.015 to 0.035 mmol of group IV metal (e.g. Ti) from the catalysts per gram of support (support treated with metal salt (e.g. $Zr(SO_4)_2 \cdot 4H_2O$)) and calcined and treated with an activator).

The phosphinimine catalyst may be added to the support in a hydrocarbyl solvent such as those noted above. The concentration of phosphinimine catalyst in the solvent is not critical. Typically, it may be present in the solution in an amount from about 5 to 15 weight %.

The supported catalyst (e.g. support, metal salt (e.g. $Zr(SO_4)_2 \cdot 4H_2O$, $ZrO(NO_3)_3$ or $Fe(NO_3)_3$), activator and catalyst) typically has a reactivity in a dispersed phase reaction (e.g. gas or slurry phase) from about 1500 to about 6000, preferably greater than 2500, most preferably greater than 3000 g of polyethylene per gram of supported catalyst per hour normalized to an ethylene partial pressure of 200 psig (1379 kPa) and a temperature of 90° C.

The supported catalyst of the present invention may be used in dispersed phase polymerizations in conjunction with a scavenger such as an aluminum alkyl of the formula $Al(R^{30})_3$ wherein $R^{30}$ is selected from the group consisting of $C_{1-10}$ alkyl radicals, preferably $C_{2-4}$ alkyl radicals. The scavenger may be used in an amount to provide a molar ratio of Al:Ti from 20 to 2000, preferably from 50 to 1000, most preferably 100:500. Generally the scavenger is added to the reactor prior to the catalyst and in the absence of additional poisons, over time declines to 0.

The supported catalyst will have a kinetic profile for a plot of ethylene consumption in standard liters of ethylene per minute against time in minutes, corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40, preferably greater than 60 most preferably from 120 to 300 data points, is less than 3.5, preferably less than 3, most preferably less than 2.

The supported catalyst may be used in conjunction with an antistatic agent. In one embodiment the antistatic is added directly to the supported catalyst. The antistatic may be added in an amount from 0 (e.g. optionally) up to 150,000 parts per million (ppm), preferably from 15,000 up to 120,000 ppm based on the weight of the supported catalyst. The antistatic may be present in an amount from 20 to 250 ppm based on the weight of the supported catalyst.

In a further embodiment the antistatic may be added to the reactor in an amount from 0 to 100, preferably from 10 to 80 ppm based on the weight of the polymer produced (i.e. the weight of polymer in the fluidized bed or the weight of polymer dispersed in the slurry phase reactor). If present the antistatic agent may be present in an amount from about 0 to 100, preferably from about 10 to 80 most preferably from 20 to 50 ppm based in the weight of polymer. From the productivity of the catalyst it is fairly routine to determine the feed rate of the antistatic to the reactor based on the catalyst feed rate.

Antistatic "Polysulfone" Additive

The antistatic polysulfone additive comprises at least one of the components selected from:
(1) a polysulfone copolymer;
(2) a polymeric polyamine; and
(3) an oil-soluble sulfonic acid, and, in addition, a solvent for the polysulfone copolymer.

Preferably, the antistatic additive comprises at least two components selected from above components (1), (2) and (3). More preferably, the antistatic additive comprises a mixture of (1), (2) and (3).

According to the present invention, the polysulfone copolymer component of the antistatic additive (often designated as olefin-sulfur dioxide copolymer, olefin polysulfones, or poly(olefin sulfone)) is a polymer, preferably a linear polymer, wherein the structure is considered to be that of alternating copolymers of the olefins and sulfur dioxide, having a one-to-one molar ratio of the comonomers with the olefins in head to tail arrangement. Preferably, the polysulfone copolymer consists essentially of about 50 mole percent of units of sulfur dioxide, about 40 to 50 mole percent of units derived from one or more 1-alkenes each having from about 6 to 24 carbon atoms, and from about 0 to 10 mole percent of units derived from an olefinic compound having the formula ACH═CHB where A is a group having the formula —($C_xH_{2x}$)—COOH wherein x is from 0 to about 17, and B is hydrogen or carboxyl, with the provision that when B is carboxyl, x is 0, and wherein A and B together can be a dicarboxylic anhydride group.

Preferably, the polysulfone copolymer employed in the present invention has a weight average molecular weight in the range 10,000 to 1,500,000, preferably in the range 50,000 to 900,000. The units derived from the one or more 1-alkenes are preferably derived from straight chain alkenes having 6-18 carbon atoms, for example 1-hexene, 1-heptene, 1-octene, 1-decene, 1-dodecene, 1-hexadecene and 1-octadecene. Examples of units derived from the one or more compounds having the formula ACH═CHB are units derived from maleic acid, acrylic acid, 5-hexenoic acid.

A preferred polysulfone copolymer is 1-decene polysulfone having an inherent viscosity (measured as a 0.5 weight percent solution in toluene at 30° C.) ranging from about 0.04 dl/g to 1.6 dl/g.

The polymeric polyamines that can be suitably employed in the antistatic of the present invention are described in U.S. Pat. No. 3,917,466, in particular at column 6 line 42 to column 9 line 29.

The polyamine component in accordance with the present invention has the general formula:

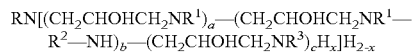

wherein $R^1$ is an aliphatic hydrocarbyl group of 8 to 24 carbon atoms, $R^2$ is an alkylene group of 2 to 6 carbon atoms, $R^3$ is the group $R^2$—$HNR^1$, R is $R^1$ or an N-aliphatic hydrocarbyl alkylene group having the formula $R^1NHR^2$; a, b and c are integers from 0 to 20 and x is 1 or 2; with the provision that when R is $R^1$ then a is greater than 2 and b=c=0, and when R is $R^1NHR^2$ then a is 0 and the sum of b+c is an integer from 2 to 20.

The polymeric polyamine may be prepared for example by heating an aliphatic primary monoamine or N-aliphatic hydrocarbyl alkylene diamine with epichlorohydrin in the molar proportion of from 1:1 to 1:1.5 at a temperature of 50° C. to 100° C. in the presence of a solvent, (e.g. a mixture of xylene and isopropanol) adding a strong base, (e.g. sodium hydroxide) and continuing the heating at 50 to 100° C. for about 2 hours. The product containing the polymeric polyamine may then be separated by decanting and then flashing off the solvent.

The polymeric polyamine is preferably the product of reacting an N-aliphatic hydrocarbyl alkylene diamine or an aliphatic primary amine containing at least 8 carbon atoms and preferably at least 12 carbon atoms with epichlorohydrin. Examples of such aliphatic primary amines are those derived from tall oil, tallow, soy bean oil, coconut oil and cotton seed oil. The polymeric polyamine derived from the reaction of tallowamine with epichlorohydrin is preferred. A method of preparing such a polyamine is disclosed in U.S. Pat. No. 3,917,466, column 12, preparation B.1.0

The above-described reactions of epichlorohydrin with amines to form polymeric products are well known and find extensive use in epoxide resin technology.

A preferred polymeric polyamine is a 1:1.5 mole ratio reaction product of N-tallow-1,3-diaminopropane with epichlorohydrin. One such reaction product is "Polyflo™ 130" sold by Universal Oil Company.

According to the present invention, the oil-soluble sulfonic acid component of the antistatic is preferably any oil-soluble sulfonic acid such as an alkanesulfonic acid or an alkylarylsulfonic acid. A useful sulfonic acid is petroleum sulfonic acid resulting from treating oils with sulfuric acid.

Preferred oil-soluble sulfonic acids are dodecylbenzenesulfonic acid and dinonylnaphthylsulfonic acid.

The antistatic additive preferably comprises 1 to 25 weight % of the polysulfone copolymer, 1 to 25 weight % of the polymeric polyamine, 1 to 25 weight % of the oil-soluble sulfonic acid and 25 to 95 weight % of a solvent. Neglecting the solvent, the antistatic additive preferably comprises about 5 to 70 weight % polysulfone copolymer, 5 to 70 weight % polymeric polyamine and 5 to 70 weight % oil-soluble sulfonic acid and the total of these three components is preferably 100%.

Suitable solvents include aromatic, paraffin and cycloparaffin compounds. The solvents are preferably selected from among benzene, toluene, xylene, cyclohexane, fuel oil, isobutane, kerosene and mixtures thereof.

According to a preferred embodiment of the present invention, the total weight of components (1), (2), (3) and the solvent represents essentially 100% of the weight of the antistatic additive.

One useful composition, for example, consists of 13.3 weight % 1:1 copolymer of 1-decene and sulfur dioxide having an inherent viscosity of 0.05 determined as above, 13.3 weight % of "Polyflo™ 130" (1:1.5 mole ratio reaction product of N-tallow-1,3-diaminopropane with epichlorohydrin), 7.4 weight % of either dodecylbenzylsulfonic acid or dinonylnaphthylsulfonic acid, and 66 weight % of an aromatic solvent which is preferably toluene or kerosene.

Another useful composition, for example, consists of 2 to 7 weight % 1:1 copolymer of 1-decene and sulfur dioxide having an inherent viscosity of 0.05 determined as above, 2 to 7 weight % of "Polyflo™ 130" (1:1.5 mole ratio reaction product of N-tallow-1,3-diaminopropane with epichlorohydrin), 2 to 8 weight % of either dodecylbenzylsulfonic acid or dinonylnaphthylsulfonic acid, and 78 to 94 weight % of an aromatic solvent which is preferably a mixture of 10 to 20 weight % toluene and 62 to 77 weight % kerosene.

According to a preferred embodiment of the present invention, the antistatic is a material sold by Octel under the trade name STADIS™, preferably STADIS™ 450, more preferably STADIS™ 425.

Gas Phase Polymerization

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

Gas phase polymerization of olefins is well known. Typically, in the gas phase polymerization of olefins (such as ethylene) a gaseous feed stream comprising of at least about 80 weight % ethylene and the balance one or more $C_{3-6}$ copolymerizable monomers typically, 1-butene, or 1-hexene or both, together with a ballast gas such as nitrogen, optionally a small amount of $C_{1-2}$ alkanes (i.e. methane and ethane) and further optionally a molecular weight control agent (typically hydrogen) is fed to a reactor and in some cases a condensable hydrocarbon (e.g. a $C_{4-6}$ alkane such as pentane). Typically, the feed stream passes through a distributor plate at the bottom of the reactor and vertically traverses a bed of polymer particles with active catalyst, typically a fluidized bed but the present invention also contemplates a stirred bed reactor. A small proportion of the olefin monomers in the feed stream react with the catalyst. The unreacted monomer and the other non-polymerizable components in the feed stream exit the bed and typically enter a disengagement zone where the velocity of the feed stream is reduced so that entrained polymer falls back into the fluidized bed. Typically the gaseous stream leaving the top of the reactor is then passed through a compressor. The compressed gas is then cooled by passage through a heat exchanger to remove the heat of reaction. The heat exchanger may be operated at temperatures below about 65° C., preferably at temperatures from 20° C. to 50° C. If there is a condensable gas it is usually condensed and entrained in the recycle stream to remove heat of reaction by vaporization as it recycles through the fluidized bed.

Polymer is removed from the reactor through a series of vessels in which monomer is separated from the off gases. The polymer is recovered and further processed. The off gases are fed to a monomer recovery unit. The monomer recovery unit may be selected from those known in the art including a distillation tower (i.e. a $C_2$ splitter), a pressure swing adsorption unit and a membrane separation device. Ethylene and hydrogen gas recovered from the monomer recovery unit are fed back to the reactor. Finally, make up feed stream is added to the reactor below the distributor plate.

Slurry Polymerization

Slurry processes are conducted in the presence of a hydrocarbon diluent such as an alkane (including isoalkanes), an aromatic or a cycloalkane. The diluent may also be the alpha olefin comonomer used in copolymerizations. Preferred alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 110° C. typically from about 10° C. to 80° C. The reaction temperature is selected so that the ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres—about 440 to 1300 psi or about 3000–9100 kPa) when propane is used (see U.S. Pat. No. 5,684,097). The pressure in a slurry process must be kept sufficiently high to keep at least part of the ethylene monomer in the liquid phase.

The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

The Polymer

The resulting polymer may have a density from about 0.910 g/cc to about 0.960 g/cc. The resulting polymers may be used in a number of applications such as film extrusion, both cast and blown film extrusion and both injection and rotomolding applications. Typically the polymer may be compounded with the usual additives including heat and light stabilizers such as hindered phenols; ultra violet light stabilizers such as hindered amine stabilizers (HALS); process aids such as fatty acids or their derivatives and fluoropolymers optionally in conjunction with low molecular weight esters of polyethylene glycol.

EXAMPLES

The present invention will now be illustrated by the following non limiting examples.

Experimental Procedure

The catalyst used in all experiments was a titanium (IV) complex having one Cp-$C_6F_5$ ligand, two chloride ligands and one tri (tertiary butyl) phosphinimine ligand ("(tBu)$_3$PN) (Cp-$C_6F_5$)TiCl$_2$").

The aluminoxane was a 10% MAO solution in toluene supplied by Albemarle.

Various sulphate and nitrate salts used were purchased from commercial sources. $Zr(SO_4)_2 \cdot 4H_2O$; $MgSO_4$; $Fe_2(SO_4)_3$; $Fe(NO_3)_3$; $ZrO(NO_3)_2$; and $Cr(NO_3)_3$.

Preparation of the Support (Apart from the Control)

Aqueous solutions of the $Zr(SO_4)_2 \cdot 4H_2O$ was prepared. The metal salt solution (10 weight %) was impregnated into the support by the incipient wetness procedure. The solid support was dried in air at about 135° C. to produce a free flowing powder. The resulting powder was subsequently dried in air at 200° C. for about 2 hours under air and then under nitrogen at 600° C. for 6 hours.

Solubility Characterization 1:

$ZrO_2$ (Sigma Aldrich, prod#230693) was calcined at 200° C. in air for 2 hours followed by calcination at 700° C. in nitrogen for 6 hours. 0.010 g of the dehydrated $ZrO_2$ was slurried in 2 mL of distilled water and stirred. There was visually 0% solubility.

Figure 3:
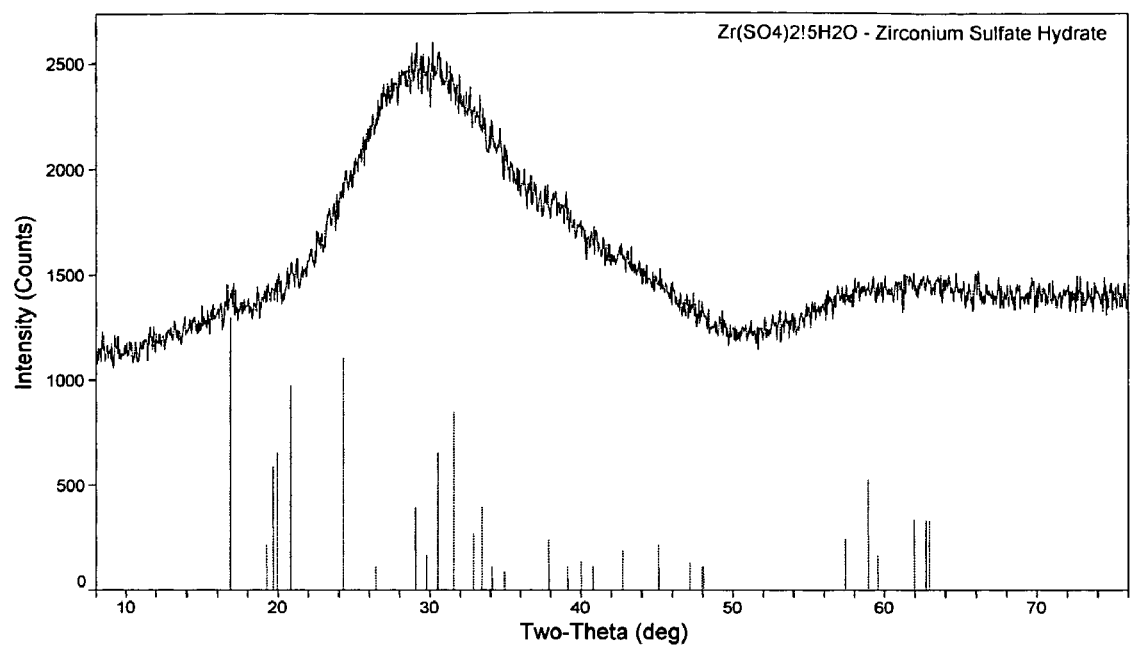
FIG. 3 is an X-ray diffraction spectrum of a calcined sample of zirconium sulphate on silica support.

Solubility Characterization 2:

$Zr(SO_4)_2.4H_2O$ (Strem Chemicals, prod#40-4750) was calcined at 200° C. in air for 2 hours followed by calcination at 600° C. in nitrogen for 6 hours. 0.010 g of the dehydrated $Zr(SO_4)_2.4H_2O$ was slurried in 2 mL of distilled water and stirred. There was visually 100% solubility. FIG. 3 is an X-ray diffraction spectrum of the calcined supported $Zr(SO_4)_2.4H_2O$.

The above shows that zirconia is not formed by the calcination process of $Zr(SO_4)_2.4H_2O$ at up to 600° C. under nitrogen.

The resulting modified support was slurried in deoxygenated and dried toluene and contacted with a solution of aluminoxane in deoxygenated and dried toluene. The slurry was vibrated on a shaker for 1 hour and then contacted with a solution of catalyst and stirred for two hours to provide a molar ratio of Al:Ti of 120:1 or 90:1. The resulting slurry was filtered and the solid catalyst dried under vacuum and sieved.

Polymerization

General procedures: All polymerization work was conducted by using a 2 liter, stirred, autoclave reactor running in a gas phase mode of operation. Polymerizations were conducted at 90° C. at a total reaction pressure of 200 pounds per square inch gauge ("psig"). (This is an ethylene partial pressure of about 197 psig). A seed bed of dry NaCl (160 g) was used. Typically from 0.4 to 1 ml of a 25% solution of triisobutyl aluminum (TIBAL) was used as a poison scavenger (to provide a molar ratio of Al from the scavenger to transition metal in the catalyst (Ti) of about 500:1). Hexene was injected into the reactor to provide about 0.019 molar hexene concentration in the reactants. The reactants comprised 0.43 to 0.5 molar ethylene.

After the addition of scavenger (and optionally, co-monomer), ethylene was used to push the catalyst system into the reactor and to bring the reactor pressure to the total pressure of 200 psig.

Example 1

Comparative

Ethylene/1-hexene was polymerized using a catalyst as described above except the support was not treated with any metal salt. The productivity in terms of grams of polymer per gram of supported catalyst per hour was about 1,200. The kinetic profile (corrected ethylene up-take in standard liters per minute) shown in FIG. 1 was such that the ratio of the maximum peak height in the first 10 minutes to the average ethylene consumption from 10 to 60 minutes (>40 data points) was 18.3.

Example 2

Ethylene/1-hexene was polymerized using a catalyst as described above in which the support was treated with 10 weight % $Zr(SO_4)_2.4H_2O$. The productivity in terms of grams of polymer per gram of supported catalyst per hour was about 4,300. The kinetic profile (corrected ethylene up-take in standard liters per minute) shown in FIG. 1 was such that the ratio of the maximum peak height in the first 10 minutes to the average ethylene consumption from 10 to 60 minutes (>40 data points) was 1.8.

Compared to the other experiments (except experiment 3) it was noted that there was a lower degree of "chunking" in the product in the reactor.

Example 3

Example 2 was repeated except that the catalyst loading in the reactor was reduced by about 33%. The productivity in terms of grams of polymer per gram of supported catalyst per hour was about 3,600. The kinetic profile (corrected ethylene up-take in standard liters per minute) shown in FIG. 1 was such that the ratio of the maximum peak height in the first 10 minutes to the average ethylene consumption from 10 to 60 minutes (>40 data points) was 1.7.

Interestingly there is a very good correlation of the maximum peak height in the first 10 minutes to average ethylene consumption from 10 to 60 minutes which demonstrates this evaluation is not dependent on catalyst loading.

Example 4

Comparative

Figure 2:
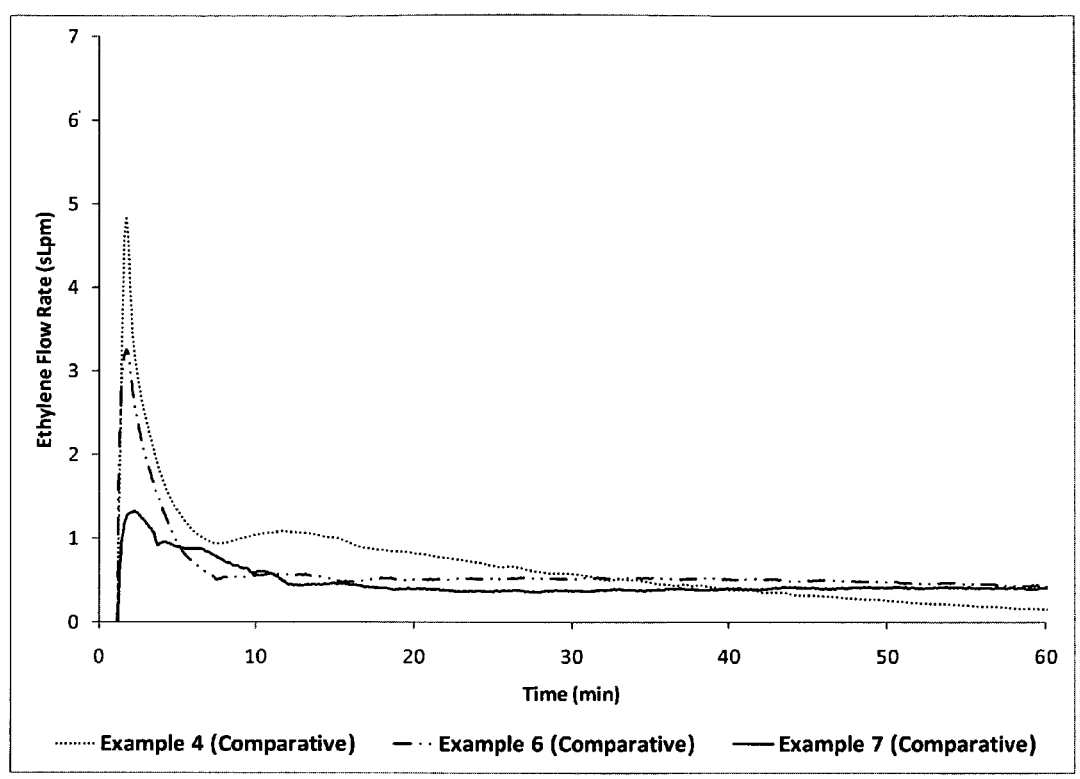
FIG. 2 is the reactor profile for ethylene uptake for examples 4, 6 and 7.

Ethylene/1-hexene was polymerized using a catalyst as described above except the support was treated with $Fe_2(SO_4)_3$. The productivity in terms of grams of polymer per gram of supported catalyst per hour was about 1,800. The kinetic profile (corrected ethylene up-take in standard liters per minute) shown in FIG. 2 was such that the ratio of the maximum peak height in the first 10 minutes to the average ethylene consumption from 10 to 60 minutes (>40 data points) was 8.9.

Example 5

Ethylene/1-hexene was polymerized using a catalyst as described above except the support was treated with $Fe(NO_3)_3$. The productivity in terms of grams of polymer per gram of supported catalyst per hour was about 3,400. The kinetic profile (corrected ethylene up-take in standard liters per minute) shown in FIG. 1 was such that the ratio of the maximum peak height in the first 10 minutes to the average ethylene consumption from 10 to 60 minutes (>40 data points) was 3.2.

Example 6

Comparative

Ethylene/1-hexene was polymerized using a catalyst as described above except the support was treated with $MgSO_4$. The productivity in terms of grams of polymer per gram of supported catalyst per hour was about 1,300. The kinetic profile (corrected ethylene up-take in standard liters per minute) shown in FIG. 2 was such that the ratio of the maximum peak height in the first 10 minutes to the average ethylene consumption from 10 to 60 minutes (>40 data points) was 6.5.

Example 7

Comparative

Ethylene/1-hexene was polymerized using a catalyst as described above except the support was treated with Cr(NO$_3$)$_3$. The productivity in terms of grams of polymer per gram of supported catalyst per hour was about 1,200. The kinetic profile (corrected ethylene up-take in standard liters per minute) shown in FIG. 2 was such that the ratio of the maximum peak height in the first 10 minutes to the average ethylene consumption from 10 to 60 minutes (>40 data points) was 3.3.

Example 8

Inventive

Ethylene/1-hexene was polymerized using a catalyst as described above except the support was treated with ZrO(NO$_3$)$_2$. The productivity in terms of grams of polymer per gram of supported catalyst per hour was about 3,000. The kinetic profile (corrected ethylene up-take in standard liters per minute) was such that the ratio of the maximum peak height in the first 10 minutes to the average ethylene consumption from 10 to 60 minutes (>40 data points) was 2.4.

Of the inventive examples it was observed that this experiment resulted in the most amount of chunking.

Table 1 below summarizes the results of the experiments.

TABLE 1

| Example | Salt | Productivity In grams of polymer per gram of supported catalyst | Maximum peak height (activity) 0-10 minutes (slpm) | Average ethylene consumption (activity) 10-60 minutes (more than 200 points) (slpm) | Maximum activity 0-10 minutes/ average activity 10-60 minutes |
|---|---|---|---|---|---|
| 1 (comparative) | None | 1,208 | 2.50 | 0.14 | 18.29 |
| 2 (inventive) | Zr(SO$_4$)$_2$·4H$_2$O | 4,296 | 2.19 | 1.66 | 1.79 |
| 3 (inventive) | Zr(SO$_4$)$_2$·4H$_2$O (reduced catalyst loading) | 3,620 | 1.73 | 1.00 | 1.74 |
| 4 (comparative) | Fe$_2$(SO$_4$)$_3$ | 1,804 | 4.70 | 0.53 | 8.93 |
| 5 (inventive) | Fe(NO$_3$)$_3$ | 3,441 | 3.68 | 1.16 | 3.16 |
| 6 (comparative) | MgSO$_4$ | 1,291 | 3.24 | 0.50 | 6.54 |
| 7 (comparative) | Cr(NO$_3$)$_3$ | 1,203 | 1.32 | 0.40 | 3.30 |
| 8 (inventive) | ZrO(NO$_3$)$_2$ | 3,022 | 2.93 | 1.25 | 2.35 |

When considering the table and figures, it is clear that a lower ratio of maximum activity (consumption of ethylene slpm) during the first 10 minutes of the reaction divided by the average activity (consumption of ethylene slpm) is preferred.

What is claimed is:

1. A method of making a catalyst system having an activity greater than 1500 g of polymer per gram of supported catalyst per hour normalized to 1379 kPag (200 psig) of ethylene partial pressure and a temperature of 90° C. and a kinetic profile for a plot of ethylene consumption in standard liters of ethylene per minute against time in minutes, at a reaction pressure of 1379 kPag (200 psig) and 90° C., corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40 data points, is less than 3.5, comprising:

i) impregnating a porous particulate inorganic oxide support having an average particle size from 10 to 150 microns, a surface area greater than 100 m$^2$/g, and a pore volume greater than 0.3 ml/g with (ii) at least a 1 weight % aqueous solution of a metal salt selected from the group consisting of Zr(SO$_4$)$_2$·4H$_2$O, ZrO(NO$_3$)$_2$ and Fe(NO$_3$)$_3$ to provide not less than 1 weight % based on the weight of the support of said salt;

(iii) recovering the impregnated support;

(iv) calcining said impregnated support in one or more steps at a temperature from 300° C. to 630° C. for a time from 2 to 20 hours in an inert atmosphere;

(v) and either (a) contacting said calcined support with a hydrocarbyl solution containing at least 5 weight % of an aluminum activator compound of the formula:

wherein each R$^{12}$ is independently selected from the group consisting of C$_{1-20}$ hydrocarbyl radicals and q is from 3 to 50 to provide from 0.1 to 30 weight % of said aluminum compound based on the weight of said calcined support;

optionally, separating said activated support from said hydrocarbyl solution and contacting said activated support with a hydrocarbyl solution containing at least 5 weight % of a single site catalyst as set out below; or (b) contacting said support with a hydrocarbyl solution containing at least 5 weight % of an aluminum activator compound of the formula:

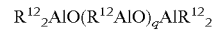

wherein each R$^{12}$ is independently selected from the group consisting of C$_{1-20}$ hydrocarbyl radicals and q is from 3 to 50 and at least 5 weight % of a single site catalyst of the formula:

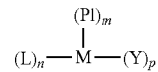

wherein M is selected from the group consisting of Ti, Zr and Hf; Pl is a phosphinimine ligand of the formula:

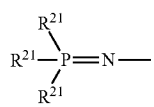

wherein each $R^{21}$ is independently selected from the group consisting of a hydrogen atom; a halogen atom; $C_{1-10}$ hydrocarbyl radicals which are unsubstituted by or further substituted by a halogen atom; $C_{1-8}$ alkoxy radicals; $C_{6-10}$ aryl or aryloxy radicals; amido radicals; silyl radicals of the formula:

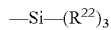

wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

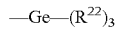

wherein $R^{22}$ is as defined above;

L is a monoanionic ligand selected from the group consisting of a cyclopentadienyl-type ligand; Y is independently selected from the group consisting of activatable ligands; m is 1 or 2; n is 0 or 1; p is an integer and the sum of m+n+p equals the valence state of M to provide a molar ratio of Al:Ti on the catalyst from 10:1 to 500:1; and (vi) recovering and drying the catalyst.

2. The process according to claim 1, wherein in the aluminum activator $R^{12}$ is a $C_{1-4}$ alkyl radical and q is from 10 to 40.

3. The process according to claim 2, wherein in the single site catalyst L is selected from the group consisting of a cyclopentadienyl radical, an indenyl radical and a fluorenyl radical which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

4. The process according to claim 3, wherein in the single site catalyst Y is selected from the group selected from the group consisting of a chlorine atom, a methyl radical, an ethyl radical and a benzyl radical.

5. The process according to claim 4, wherein in the single site catalyst $R^{21}$ is selected from the group consisting of $C_{1-6}$ alkyl radicals.

6. The process according to claim 5, wherein the supported catalyst has a reactivity of greater than 3000 g of polyethylene per gram of supported catalyst per hour.

7. The process according to claim 6, wherein the salt is $Fe(NO_3)_3$.

8. The process according to claim 6, wherein the kinetic profile for a plot of ethylene consumption in standard liters of ethylene per minute against time in minutes, at a reaction pressure of 1379 kPag (200 psig) and 90° C., corrected for the volume of ethylene in the reactor prior to the commencement of the reaction, in a 2 liter reactor over a period of time from 0 to 60 minutes is such that the ratio of the maximum peak height over the first 10 minutes to the average ethylene consumption from 10 to 60 minutes taken at not less than 40, data points, is less than 3.0.

9. The process according to claim 8 wherein the salt is $ZrO(NO_3)_2$.

10. The process according to claim 8, wherein the salt is $Zr(SO_4)_2 \cdot 4H_2O$.

11. The process according to claim 6, further comprising contacting said catalyst with from 50 to 250 ppm based on the weight of the supported catalyst of an antistatic comprising:
(i) from 3 to 48 parts by weight of one or more polysulfones comprising:
(a) 50 mole % of units of sulphur dioxide;
(b) 40 to 50 mole % of units derived from a $C_{6-20}$ alpha olefin; and
(c) from 0 to 10 mole % of units derived from a compound of the formula ACH=CHB where A is selected from the group consisting of a carboxyl radical and a $C_{1-15}$ carboxy alkyl radical and B is a hydrogen atom or a carboxyl radical provided if A and B are carboxyl radicals A and B may form an anhydride;
(ii) from 3 to 48 parts by weight of one or more polymeric polyamides of the formula:

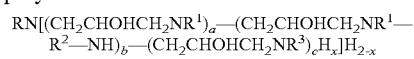

wherein $R^1$ is an aliphatic hydrocarbyl group of 8 to 24 carbon atoms; $R^2$ is an alkylene group of 2 to 6 carbon atoms; $R^3$ is the group $R^2$—$HNR^1$; R is $R^1$ or an N-aliphatic hydrocarbyl alkylene group having the formula $R^1NHR^2$; a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and
(iii) from 3 to 48 parts by weight of $C_{10-20}$ alkyl or arylalkyl sulphonic acid and optionally from 0 to 150 parts by weight of a solvent or diluent.

12. The process according to claim 7, further comprising contacting said catalyst with from 50 to 250 ppm based on the weight of the supported catalyst of an antistatic comprising:
(i) from 3 to 48 parts by weight of one or more polysulfones comprising:
(a) 50 mole % of units of sulphur dioxide;
(b) 40 to 50 mole % of units derived from a $C_{6-20}$ alpha olefin; and
(c) from 0 to 10 mole % of units derived from a compound of the formula ACH=CHB where A is selected from the group consisting of a carboxyl radical and a $C_{1-15}$ carboxy alkyl radical; and B is a hydrogen atom or a carboxyl radical provided if A and B are carboxyl radicals A and B may form an anhydride;
(ii) from 3 to 48 parts by weight of one or more polymeric polyamides of the formula:

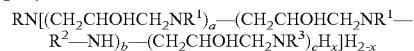

wherein $R^1$ is an aliphatic hydrocarbyl group of 8 to 24 carbon atoms; $R^2$ is an alkylene group of 2 to 6 carbon atoms; $R^3$ is the group $R^2$—$HNR^1$; R is $R^1$ or an N-aliphatic hydrocarbyl alkylene group having the formula $R^1NHR^2$; a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and
(iii) from 3 to 48 parts by weight of $C_{10-20}$ alkyl or arylalkyl sulphonic acid and optionally from 0 to 150 parts by weight of a solvent or diluent.

13. The process according to claim 8, further comprising contacting said catalyst with from 15,000 to 120,000 ppm based on the weight of the supported catalyst of an antistatic comprising:
(i) from 3 to 48 parts by weight of one or more polysulfones comprising:
(a) 50 mole % of units of sulphur dioxide;
(b) 40 to 50 mole % of units derived from a $C_{6-20}$ alpha olefin; and (c) from 0 to 10 mole % of units derived from a compound of the formula ACH=CHB where A is selected from the group consisting of a carboxyl radical and a $C_{1-15}$ carboxy alkyl radical; and B is a hydrogen atom or a carboxyl radical provided if A and B are carboxyl radicals A and B may form an anhydride;

(ii) from 3 to 48 parts by weight of one or more polymeric polyamides of the formula:

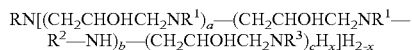

wherein $R^1$ is an aliphatic hydrocarbyl group of 8 to 24 carbon atoms; $R^2$ is an alkylene group of 2 to 6 carbon atoms; $R^3$ is the group-$R^2$—$HNR^1$; R is $R^1$ or an N-aliphatic hydrocarbyl alkylene group having the formula $R^1NHR^2$; a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and (iii) from 3 to 48 parts by weight of $C_{10-20}$ alkyl or arylalkyl sulphonic acid and optionally from 0 to 150 parts by weight of a solvent or diluent.

14. The process according to claim 9, further comprising contacting said catalyst with from 15,000 to 120,000 ppm based on the weight of the supported catalyst of an antistatic comprising:

(i) from 3 to 48 parts by weight of one or more polysulfones comprising:
(a) 50 mole % of units of sulphur dioxide;
(b) 40 to 50 mole % of units derived from a $C_{6-20}$ alpha olefin; and
(c) from 0 to 10 mole % of units derived from a compound of the formula ACH=CHB where A is selected from the group consisting of a carboxyl radical and a $C_{1-15}$ carboxy alkyl radical; and B is a hydrogen atom or a carboxyl radical provided if A and B are carboxyl radicals A and B may form an anhydride;

(ii) from 3 to 48 parts by weight of one or more polymeric polyamides of the formula:

wherein $R^1$ is an aliphatic hydrocarbyl group of 8 to 24 carbon atoms; $R^2$ is an alkylene group of 2 to 6 carbon atoms; $R^3$ is the group $R^2$—$HNR^1$; R is $R^1$ or an N-aliphatic hydrocarbyl alkylene group having the formula $R^1NHR^2$; a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and (iii) from 3 to 48 parts by weight of $C_{10-20}$ alkyl or arylalkyl sulphonic acid and optionally from 0 to 150 parts by weight of a solvent or diluent.

15. The process according to claim 10, further comprising contacting said catalyst with from 15,000 to 120,000 ppm based on the weight of the supported catalyst of an antistatic comprising:

(i) from 3 to 48 parts by weight of one or more polysulfones comprising:
(a) 50 mole % of units of sulphur dioxide;
(b) 40 to 50 mole % of units derived from a $C_{6-20}$ alpha olefin; and
(c) from 0 to 10 mole % units derived from of a compound of the formula ACH=CHB where A is selected from the group consisting of a carboxyl radical and a $C_{1-15}$ carboxy alkyl radical; and B is a hydrogen atom or a carboxyl radical provided if A and B are carboxyl radicals A and B may form an anhydride;

(ii) from 3 to 48 parts by weight of one or more polymeric polyamides of the formula:

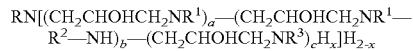

wherein $R^1$ is an aliphatic hydrocarbyl group of 8 to 24 carbon atoms; $R^2$ is an alkylene group of 2 to 6 carbon atoms; $R^3$ is the group-$R^2$—$HNR^1$; R is $R^1$ or an N-aliphatic hydrocarbyl alkylene group having the formula $R^1NHR^2$; a, b and c are integers from 0 to 20 and x is 1 or 2; with the proviso that when R is $R^1$ then a is greater than 2 and b=c=0, and when R is $R^1NHR^2$ then a is 0 and the sum of b+c is an integer from 2 to 20; and (iii) from 3 to 48 parts by weight of $C_{10-20}$ alkyl or arylalkyl sulphonic acid and optionally from 0 to 150 parts by weight of a solvent or diluent.

16. A dispersed phase olefin polymerization process having improved reactor continuity conducted in the presence of a catalyst prepared according to claim 6.

17. A dispersed phase olefin polymerization process having improved reactor continuity conducted in the presence of a catalyst prepared according to claim 7.

18. A dispersed phase olefin polymerization process having improved reactor continuity conducted in the presence of a catalyst prepared according to claim 8.

19. A dispersed phase olefin polymerization process having improved reactor continuity conducted in the presence of a catalyst prepared according to claim 9.

20. A dispersed phase olefin polymerization process having improved reactor continuity conducted in the presence of a catalyst prepared according to claim 10.

21. A dispersed phase olefin polymerization process having improved reactor continuity conducted in the presence of a catalyst prepared according to claim 11.

22. A dispersed phase olefin polymerization process having improved reactor continuity conducted in the presence of a catalyst prepared according to claim 12.

23. A dispersed phase olefin polymerization process having improved reactor continuity conducted in the presence of a catalyst prepared according to claim 13.

24. A dispersed phase olefin polymerization process having improved reactor continuity conducted in the presence of a catalyst prepared according to claim 14.

25. A dispersed phase olefin polymerization process having improved reactor continuity conducted in the presence of a catalyst prepared according to claim 15.

26. The dispersed phase olefin polymerization process according to claim 16, which is a gas phase polymerization process.

27. The dispersed phase olefin polymerization process according to claim 26 in which an aluminum alkyl scavenger of the formula $Al(R^{30})_3$ wherein $R^{30}$ is selected from the group consisting of $C_{1-10}$ alkyl radicals is present in an amount from to provide a molar ratio of Al:Ti from 20 to 2000.

28. The dispersed phase olefin polymerization process according to claim 18, which is a gas phase polymerization process.

29. The dispersed phase olefin polymerization process according to claim 28 in which an aluminum alkyl scavenger of the formula $Al(R^{30})_3$ wherein $R^{30}$ is selected from the group consisting of $C_{1-10}$ alkyl radicals is present in an amount from to provide a molar ratio of Al:Ti from 20 to 2000.

30. The dispersed phase olefin polymerization process according to claim 21, which is a gas phase polymerization process.

31. The dispersed phase olefin polymerization process according to claim 30 in which an aluminum alkyl scavenger of the formula $Al(R^{30})_3$ wherein $R^{30}$ is selected from the group consisting of $C_{1-10}$ alkyl radicals is present in an amount from to provide a molar ratio of Al:Ti from 20 to 2000.

32. The dispersed phase olefin polymerization process according to claim 23, which is a gas phase polymerization process.

33. The dispersed phase olefin polymerization process according to claim 32 in which an aluminum alkyl scavenger of the formula $Al(R^{30})_3$ wherein $R^{30}$ is selected from the group consisting of $C_{1-10}$ alkyl radicals is present in an amount from to provide a molar ratio of Al:Ti from 20 to 2000.

34. The dispersed phase olefin polymerization process according to claim 16, which is a slurry phase process.

35. The dispersed phase olefin polymerization process according to claim 18, which is a slurry phase process.

36. The dispersed phase olefin polymerization process according to claim 21, which is a slurry phase process.

37. The dispersed phase olefin polymerization process according to claim 23, which is a slurry phase process.

* * * * *